United States Patent
Ramachandra et al.

(10) Patent No.: US 10,306,530 B2
(45) Date of Patent: May 28, 2019

(54) WIRELESS DEVICE, RADIO NETWORK NODES, AND METHODS PERFORMED THEREIN FOR HANDLING MOBILITY IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Mehdi Amirijoo, Linköping (SE); Håkan Axelsson, Linköping (SE); Rasmus Axén, Linköping (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/556,005

(22) PCT Filed: Nov. 15, 2016

(86) PCT No.: PCT/SE2016/051125
§ 371 (c)(1),
(2) Date: Sep. 6, 2017

(87) PCT Pub. No.: WO2018/093300
PCT Pub. Date: May 24, 2018

(65) Prior Publication Data
US 2018/0270729 A1  Sep. 20, 2018

(51) Int. Cl.
*H04W 36/30* (2009.01)
*H04B 7/06* (2006.01)
(Continued)

(52) U.S. Cl.
CPC ............ *H04W 36/30* (2013.01); *H04B 7/04* (2013.01); *H04B 7/0617* (2013.01);
(Continued)

(58) Field of Classification Search
CPC . H04W 36/0088; H04W 36/38; H04W 36/30; H04W 48/16; H04W 24/10;
(Continued)

(56) References Cited

U.S. PATENT DOCUMENTS

| 2014/0192672 | A1 | 7/2014 | Seo et al. |
| 2015/0257073 | A1* | 9/2015 | Park ............... H04B 7/0408 370/331 |
| 2016/0269093 | A1* | 9/2016 | Seol ................. H04B 7/043 |

FOREIGN PATENT DOCUMENTS

| EP | 2928234 A1 | 10/2015 |
| WO | 2016003336 A1 | 1/2016 |

OTHER PUBLICATIONS

International Search Report dated Aug. 21, 2017 for International Application Serial No. PCT/SE2016/051125, International Filing Date: Nov. 15, 2016 consisting of 5-pages.
(Continued)

*Primary Examiner* — Wayne H Cai
(74) *Attorney, Agent, or Firm* — Christopher & Weisberg, P.A.

(57) ABSTRACT

A method performed by a first radio network node for handling mobility of a wireless device in a wireless communication network. The first radio network node provides radio coverage over a first service area using a first reference signal for identifying the first service area in the wireless communication network. A second radio network node provides radio coverage over a second service area using a second reference signal for identifying the second service area in the wireless communication network. The first radio network node receives a measurement report from the second radio network node, which measurement report indicates a second signal strength or quality of a second dedicated beam used for data transmission for wireless devices in the second service area. The first radio network
(Continued)

node performs a mobility decision for the wireless device taking the second signal strength or quality, indicated in the received measurement report, into account.

12 Claims, 10 Drawing Sheets

(51) Int. Cl.
| | |
|---|---|
| H04W 36/00 | (2009.01) |
| H04W 24/10 | (2009.01) |
| H04B 7/04 | (2017.01) |
| H04W 36/38 | (2009.01) |
| H04W 48/16 | (2009.01) |

(52) U.S. Cl.
CPC .......... *H04B 7/0632* (2013.01); *H04W 24/10* (2013.01); *H04W 36/00* (2013.01); *H04W 36/0083* (2013.01); *H04W 36/0088* (2013.01); *H04W 36/38* (2013.01); *H04W 48/16* (2013.01)

(58) Field of Classification Search
CPC .... H04W 36/00; H04W 36/0083; H04B 7/04; H04B 7/0617; H04B 7/0632
See application file for complete search history.

(56) References Cited

OTHER PUBLICATIONS

3GPP TR 38.913 V0.3.0 Title: "3rd Generation Partnership Project; Technical Specification Group Radio Access Network; Study on Scenarios and Requirements for Next Generation Access Technologies; (Release 14)," Mar. 2016 consisting of 30-pages.

3GPP TSG-RAN Meeting #71, RP-160671, Title: "New SID Proposal: Study on New Radio Access Technology," Agenda Item: 9.1, Source: NTT DOCOMO, Document for Discussion, Location and Date: Goteborg, Sweden Mar. 7-10, 2016 consisting of 8-pages.

3GPP TSG-RAN WG2 #93bis, Tdoc R2-162762, Title: "Active Mode Mobility in NR: SINR drops in higher frequencies," Agenda Item: 9.5.3, Source: Ericsson, Document for Discussion, Decision, Location and Date: Dubrovnik, Croatia Apr. 11-15, 2016 consisting of 4-pages.

3GPP TR 23.799 V0.5.0 Title: "3rd Generation Partnership Project; Technical Specification Group Services and System Aspects; Study on Architecture for the Next Generation System; (Release 14)," May 2016 consisting of 178-pages.

3GPP TSG RAN1 86b, R1-1612056, Title: "Beam management for NR," Agenda Item: 7.1.3.3, Source: Qualcomm, Document for Discussion and Decision, Location and Date: Reno, Nevada Nov. 14-18, 2016 consisting of 4-pages.

3GPP TSG RAN WG1 #87, R1-1612346, Title: "RS for beam management," Agenda Item: 7.1.3.3, Source: Ericsson, Document for Discussion and Decision, Location and Date: Reno, Nevada Nov. 14-18, 2016 consisting of 4-pages.

* cited by examiner

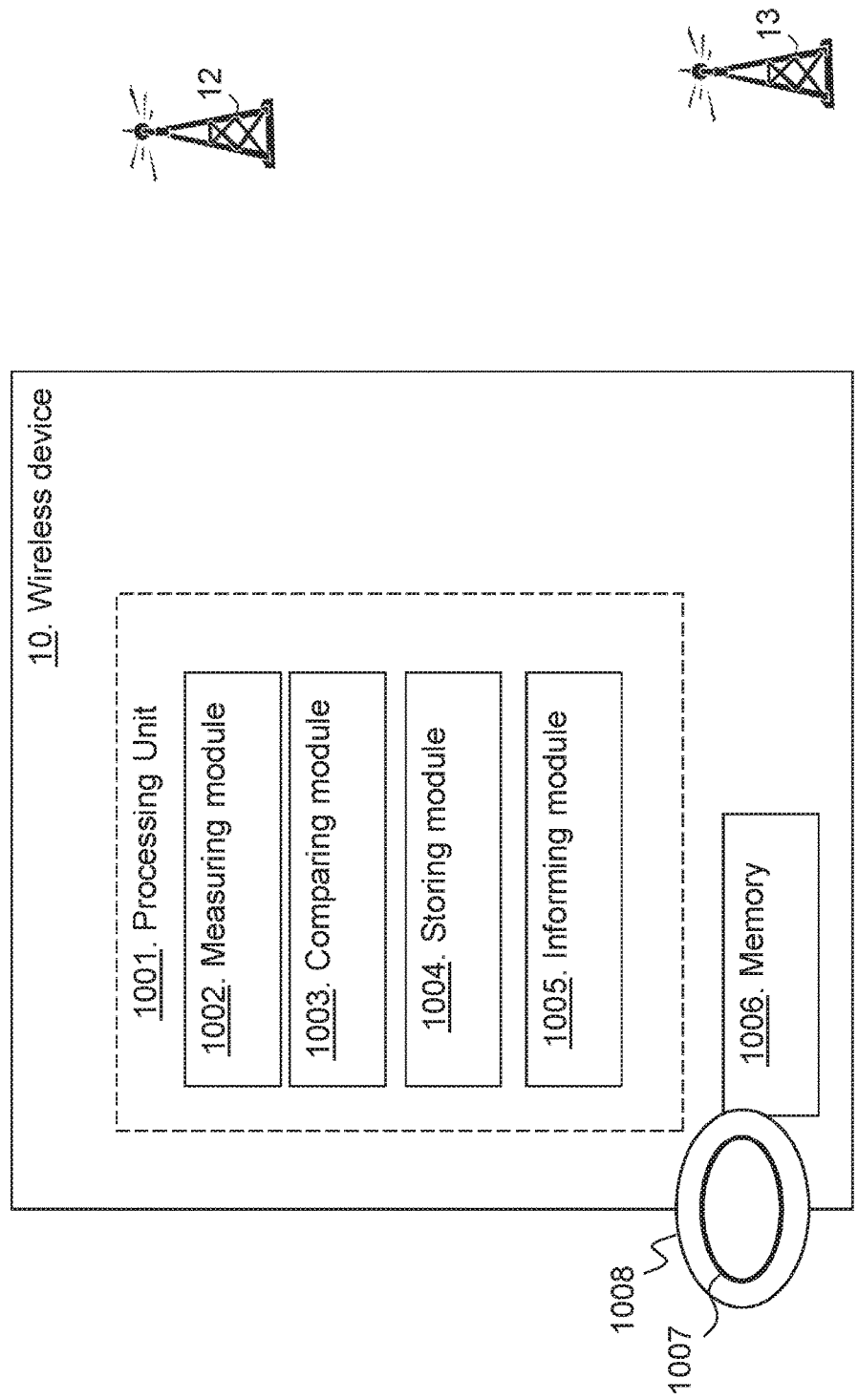

WIRELESS DEVICE, RADIO NETWORK NODES, AND METHODS PERFORMED THEREIN FOR HANDLING MOBILITY IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2015/051125, filed Nov. 15, 2016 entitled "WIRELESS DEVICE, RADIO NETWORK NODES, AND METHODS PERFORMED THEREIN FOR HANDLING MOBILITY IN A WIRELESS COMMUNICATION NETWORK," the entirety of which is incorporated herein by reference.

TECHNICAL FIELD

Embodiments herein relate to a wireless device, radio network nodes and methods performed therein regarding wireless communication. Furthermore, a computer program and a computer-readable storage medium are also provided herein. In particular, embodiments herein relate to handling mobility of the wireless device in a wireless communication network. Handling mobility means e.g., determining whether to handover the wireless device to another radio network node or not.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the V Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network, E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Overall requirements for the Next Generation (NG) architecture e.g. TR 23.799 v. 0.5.0, and, more specifically the NG Access Technology, e.g. TR 38.913 v. 0.3.0 will impact the design of the Active Mode Mobility solutions for the New Radio Access Technology (NR), see RP-160671 New SID Proposal: Study on New Radio Access Technology, DoCoMo, compared to the current mobility solution in LTE. Some of these requirements are the need to support network energy efficiency mechanisms, future-proof-ness and the need to support a very wide range of frequencies e.g., up to 100 GHz.

One of the main differences, with respect to LTE, comes from the fact that propagation in frequencies above the ones allocated to LTE is more challenging so that the massive usage of beamforming becomes an essential component of NR. Despite the link budget gains provided by beamforming solutions, reliability of a system purely relying on beam-forming and operating in higher frequencies might be challenging, since the coverage might be more sensitive to both time and space variations. As a consequence of that a Signal to Interference plus Noise Ratio (SINR) of a narrow link can drop much quicker than in the case of LTE, see R2-162762, Active Mode Mobility in NR: SINR drops in higher frequencies, Ericsson.

To support Transmit (Tx)-side beamforming at a radio network node, a number of reference signals may be transmitted from the radio network node, whereby the wireless device can measure signal strength or quality of these reference signals and report the measurement results to the radio network node. The radio network node may then use these measurements to decide which beam(s) to use for the one or more wireless devices.

A combination of periodic and scheduled reference signals may be used for this purpose.

The periodic reference signals, typically called beam reference signals (BRS) or Mobility Reference Signals (MRS), are transmitted repeatedly, in time, in a large number of different directions using as many Tx-beams as deemed necessary to cover a service area of the radio network node. As the naming indicates, each BRS represents a unique Tx-beam from that radio network node. This allows a wireless device to measure the BRS when transmitted in different beams, without any special arrangement for that wireless device from the radio network node perspective. The wireless device reports e.g. the received powers for different BRSs, or equivalently different Tx-beams, back to the radio network node.

The scheduled reference signals, called channel-state information reference signals (CSI-RS), are transmitted only when needed for a particular connection. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a NR network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

Beamforming introduces a possibility to enhance the signal towards a specific location. This enables better signal to noise ratio towards a specific wireless device.

A specific beamforming towards a specific wireless device is handled per Transmission Time Interval (TTI) where a number of factors and measurements are used to determine how the beamforming should look like. With an increasing number of antenna elements, the number of possible beams that theoretically can be created increases a lot.

When performing mobility measurements, it will be quite difficult to create all or the best of any possible beams that is optimal from a location of the wireless device on which the specific wireless device can perform its measurement evaluation needed for mobility triggers. Instead a reasonable number of static beams are created, upon request or configured, that are supposed to cover a specific service area. An increasing number of static beams improves the possibility to get as accurate measurement as possible towards a specific location, but it also increases energy consumption and increases complexity in the RAN system, due to complex configuration, planning etc. The number of static beams to perform generic mobility measurements on is supposed to be a lot less than the dedicated beams possible to beam-form towards a specific wireless device in any location of the coverage area served by the radio network node.

The difference in characteristics of a mobility measurement beam, called a MRS beam or a static beam, and a fully dedicated beam for data transmission towards a specific wireless device, also referred to as UE dedicated beam or dedicated beam for data transmission, also creates a difference in what is measured on and what the result will be if the mobility action is performed and a dedicated beam for data transmission is created towards the wireless device. This may lead to wrong decisions when to perform a beam switch or not. In FIG. 1 the fully lined beam represents the mobility measurement beam and the dashed line beam represents a dedicated beam for data transmission towards a specific wireless device. Thus, it is shown a difference between the mobility measurement signal strength and the UE dedicated, beam-formed, beam signal strength.

In FIG. 2, there is one wireless device and three radio network nodes, AN1, AN2 and AN3, each radio network node provides a respective mobility measurement beam and each radio network node also has one dedicated beam for data transmission towards the wireless device. Note that the dedicated beam for data transmission normally only exists from the radio network node currently serving the wireless device, due to that this type of beam needs a lot of ongoing measurements and feedback from the wireless device to be shaped correctly, and these measurements and feedback are normally only available to the radio network node currently serving the wireless device with data transmissions. A mobility decision for the wireless device based on measurements on mobility measurement beams may lead to a non optimal decision resulting in a reduced or limited performance of the wireless communication network.

SUMMARY

An object of embodiments herein is to provide a mechanism that improves the performance of the wireless communication network when performing a mobility decision for a wireless device.

According to an aspect the object is achieved by providing a method performed by a first radio network node for handling mobility of a wireless device in a wireless communication network. The first radio network node provides radio coverage over a first service area using a first reference signal, also referred to as a first static beam or first mobility measurement beam, for identifying the first service area in the wireless communication network. The second radio network node provides radio coverage over a second service area using a second reference signal, also referred to as a second static beam or second mobility measurement beam, for identifying the second service area in the wireless communication network. The first radio network node receives a measurement report from the second radio network node, which measurement report indicates a second signal strength or quality of a second dedicated beam used for data transmission for wireless devices in the second service area. The first radio network node further performs a mobility decision for the wireless device taking the second signal strength or quality, indicated in the received measurement report, into account.

According to another aspect the object is achieved by providing a method performed by a second radio network node for handling mobility of a wireless device in a wireless communication network. The wireless device is served by a first radio network node providing radio coverage over a first service area using a first reference signal for identifying the first service area in the wireless communication network, and the second radio network node provides radio coverage over a second service area using a second reference signal for identifying the second service area in the wireless communication network. The second radio network node obtains a second signal strength or quality of a second dedicated beam for data transmission for wireless devices in the second service area. Furthermore, the second radio network node transmits to the first radio network node a measurement report, which measurement report indicates the obtained second signal strength or quality of the second dedicated beam for data transmission for wireless devices in the second service area.

According to yet another aspect the object is achieved by providing a method performed by a wireless device for handling mobility of the wireless device in a wireless communication network. The wireless device is served by a first radio network node providing radio coverage over a first service area using a first reference signal for identifying the first service area in the wireless communication network, and a second radio network node provides radio coverage over a second service area using a second reference signal for identifying the second service area in the wireless communication network. The wireless device measures a first local signal strength or quality of the first reference signal and a second local signal strength or quality of the second reference signal at the wireless device. The wireless device compares the first local signal strength or quality of the first reference signal with the second local signal strength or quality of the second reference signal. When comparing indicates a certain condition, e.g. indicates a handover, or a difference in received powers of reference signals above a threshold, the wireless device measures a first signal strength or quality of a first dedicated beam for data transmission for the wireless device in the first service area over a first local time period to or until handover of the wireless device is triggered. The wireless device further stores the measured first signal strength or quality over the first local time period.

It is herein also provided a computer program comprising instructions, which, when executed on at least one processor, causes the at least one processor to carry out the methods herein, as performed by the wireless device, the first radio network node, or the second radio network node. Furthermore, it is herein provided a computer-readable storage medium, having stored thereon a computer program comprising instructions which, when executed on at least one processor, cause the at least one processor to carry out the methods herein, as performed by the wireless device, the first radio network node, or the second radio network node.

According to still another aspect the object is achieved by providing a first radio network node for handling mobility of a wireless device in a wireless communication network. The first radio network node is configured to provide radio coverage over a first service area using a first reference signal for identifying the first service area in the wireless communication network. The first radio network node is configured to receive a measurement report from a second radio network node being configured to provide radio coverage over a second service area using a second reference signal for identifying the second service area in the wireless communication network. The measurement report indicates a second signal strength or quality of a second dedicated beam used for data transmission for wireless devices in the second service area. The first radio network node is further configured to perform a mobility decision for the wireless device taking the second signal strength or quality, indicated in the received measurement report, into account.

According to yet still another aspect the object is achieved by providing a second radio network node for handling mobility of a wireless device in a wireless communication network, wherein the second radio network node is configured to provide radio coverage over a second service area using a second reference signal for identifying the second service area in the wireless communication network. The wireless device is served by a first radio network node providing radio coverage over a first service area using a first reference signal for identifying the first service area in the wireless communication network. The second radio network node is configured to obtain a second signal strength or quality of a second dedicated beam for data transmission for wireless devices in the second service area. Furthermore, the second radio network node is configured to transmit, to the first radio network node, a measurement report, which measurement report indicates the obtained second signal strength or quality of the second dedicated beam for data transmission for wireless devices in the second service area.

According to another aspect the object is achieved by providing a wireless device for handling mobility of the wireless device in a wireless communication network, the wireless device is configured to be served by a first radio network node providing radio coverage over a first service area using a first reference signal for identifying the first service area in the wireless communication network. A second radio network node is configured to provide radio coverage over a second service area using a second reference signal for identifying the second service area in the wireless communication network. The wireless device is configured to measure a first local signal strength or quality of the first reference signal and a second local signal strength or quality of the second reference signal at the wireless device. Furthermore, the wireless device is configured to compare the first local signal strength or quality of the first reference signal with the second local signal strength or quality of the second reference signal. The wireless device is configured to, when the comparison indicates a certain condition, e.g. indicates a handover, measure a first signal strength or quality of a first dedicated beam for data transmission for the wireless device in the first service area over a first local time period to handover of the wireless device is triggered. The wireless device is then configured to store the measured first signal strength or quality over the first local time period.

According to embodiments herein the second radio network node obtains one or more second signal strengths or qualities of second dedicated beams for data transmissions for wireless devices. These are sent in the measurement report to the first radio network node serving the wireless device and the first radio network node decides whether to e.g. handover the wireless device to the second radio network node by taking these one or more second signal strengths or qualities into account. For example, the first radio network node may compute relations between measurements on static beams and dedicated beams of the different radio network nodes and based on these relations perform the mobility decision. Furthermore, the wireless device according to some embodiments herein may collect and store information relevant for the mobility decision and this information may be used as statistics or as a parameter when performing the mobility decision. Hence, embodiments herein provide a manner of improving the decision of mobility since the data used when performing the mobility decision is more relevant than using measurements of e.g. static beams, avoiding unnecessary handovers or performing necessary handovers, which leads to an improved performance of the wireless communication network.

BRIEF DESCRIPTION OF THE DRAWINGS

Embodiments will now be described in more detail in relation to the enclosed drawings, in which:

FIG. 10 is a block diagram depicting a wireless device according to embodiments herein.

DETAILED DESCRIPTION

Figure 1:
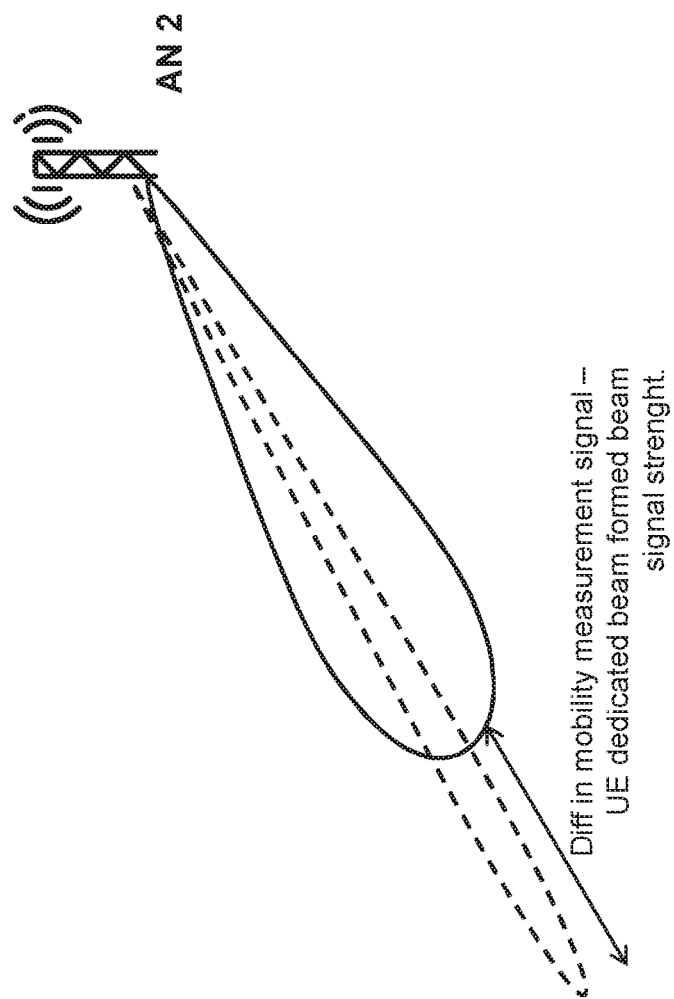
FIG. 1 shows a schematic overview depicting a static beam and a dedicated beam of a radio network node.
Figure 2:
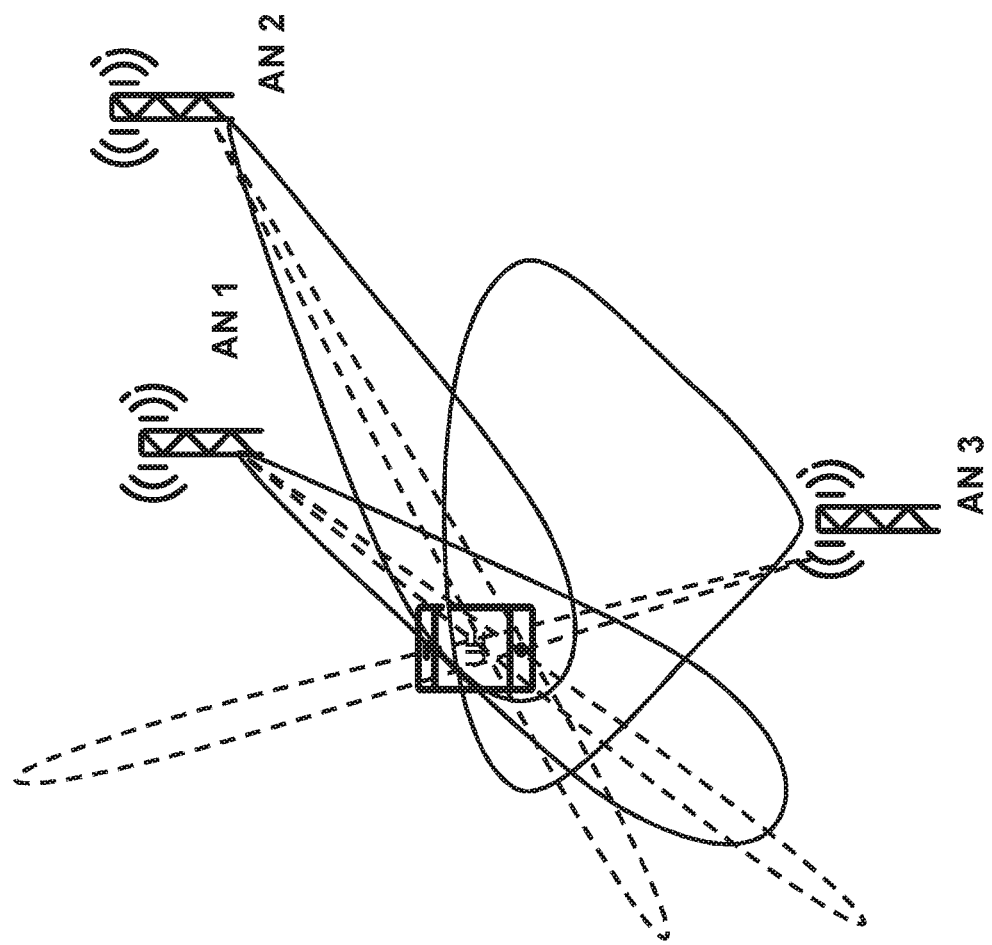
FIG. 2 shows a schematic overview depicting a multiple beam scenario.
Figure 3:
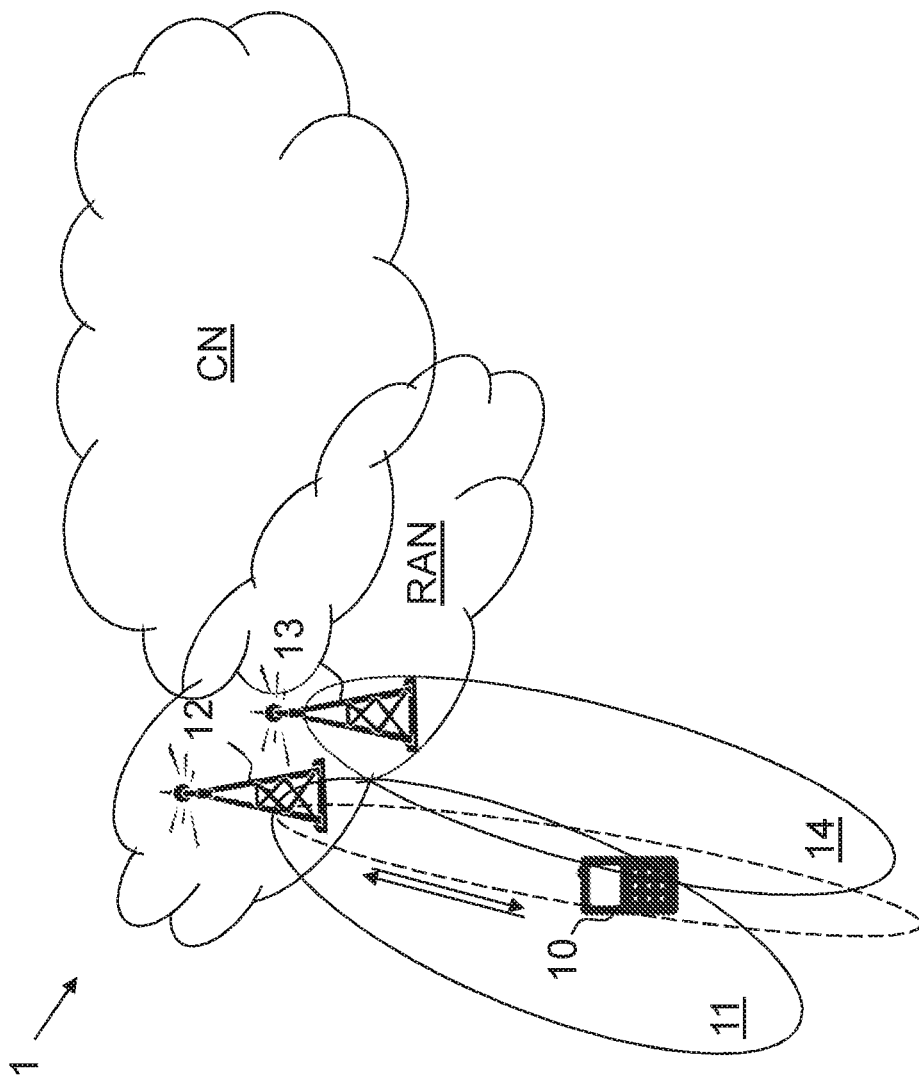
FIG. 3 shows a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal; wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11 or a first static beam, of a first radio access technology (RAT), such as NR, LTE, Wi-Fi, WiMAX or similar. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the first radio network node 12 depending e.g. on the first radio access technology and terminology used. The first radio network node 12 may be referred to as a serving network node wherein the first service area may be referred to as a serving static beam or source static beam, and the serving network node communicates with the wireless device 10 in form of DL transmissions to the wireless device 10 and UL transmissions from the wireless device 10.

A second radio network node 13 may further provide radio coverage over a second service area 14 or a second static beam of a second radio access technology (RAT), such as NR, LTE, Wi-Fi, WiMAX or similar. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring static beam or target static beam.

It should be noted that a service area may be denoted as cell, static beam, mobility measurement beam, beam group or similar to define an area of radio coverage. The radio network nodes transmit MRSs over respective service area. Hence, the first and second radio network nodes transmit MRS or beam reference signals (BRS), repeatedly, in time, in a large number of different directions using as many Tx-beams as deemed necessary to cover an operational area of the respective radio network node. Hence the first radio network node 12 provides radio coverage over the first service area using a first reference signal, e.g., first MRS, for identifying the first service area 11 in the wireless communication network. The second radio network node 13 provides radio coverage over the second service area 14 using a second reference signal, e.g. second MRS, for identifying the second service area 14 in the wireless communication network. These reference signals, first and second MRS, may be initiated upon request from a radio network node, e.g. a neighboring radio network node, or configured to be sent continuously.

When entering into the respective service area, wireless devices may be served by the respective radio network node by providing a respective dedicated beam for data transmissions for a specific wireless device. The dedicated beams for data transmission for a specific wireless device may use demodulation reference signals identifying the beam-formed beam and/or channel state information reference signals.

These dedicated beams have different characteristics and performances compared to the service areas or static beams.

As part of developing embodiments herein one or more problems have been identified. For example, to compare the dedicated beam for data transmission with one of the mobility measurement beams, i.e. service areas, would typically not be fair since the dedicated beam for data transmission is actively shaped to maximize the energy transmitted towards this specific wireless device whereas the mobility measurement beam is instead shaped to serve a service area where multiple wireless devices can be located. Using this comparison would cause the trigger point for mobility to happen too late, compared to an optimal point where a beam switch should occur. Comparing mobility measurement beams towards each other will in most cases neither create a fair comparison since the mobility measurement beam can be shaped differently in the radio network nodes and also e.g. an antenna capability of the radio network node may affect the result where one is better to beam-form a dedicated beam towards a specific wireless device compared to the other.

According to embodiments herein the first radio network node 12 performs a mobility decision, such as a handover decision, cell reselection decision, or similar, for the wireless device 10 taking into account a second signal strength or quality, also denoted second dedicated signal strength or quality, of a second dedicated beam for data transmission for wireless devices in the second service area. This second signal strength or quality is received in a measurement report from the second radio network node 13. Thus, embodiments herein provide a solution how to handle the difference in mobility measurement on a static non wireless device specific beam, also denoted service area herein, and a result for a fully beam-formed beam towards a specific wireless device, also denoted herein as a dedicated beam for data transmission for the wireless device.

A capability of the wireless device 10 may also be considered when comparing the strengths or qualities of the different radio network nodes since the wireless device might not fully be capable of benefitting from an advanced radio network node even if present in a beam of the advanced radio network node.

Note that in a general scenario the term "radio network node" can be substituted with "transmission point". The key observation is that it must be possible to make a distinction between the transmission points (TPs), typically based on MRSs or different synchronization signals and BRSs transmitted. Several TPs may be logically connected to the same radio network node but if they are geographically separated, or are pointing in different propagation directions, the TPs will be subject to the same mobility issues as different radio network nodes. In subsequent sections, the terms "radio network node" and "TP" can be thought of as interchangeable.

Figure 4:
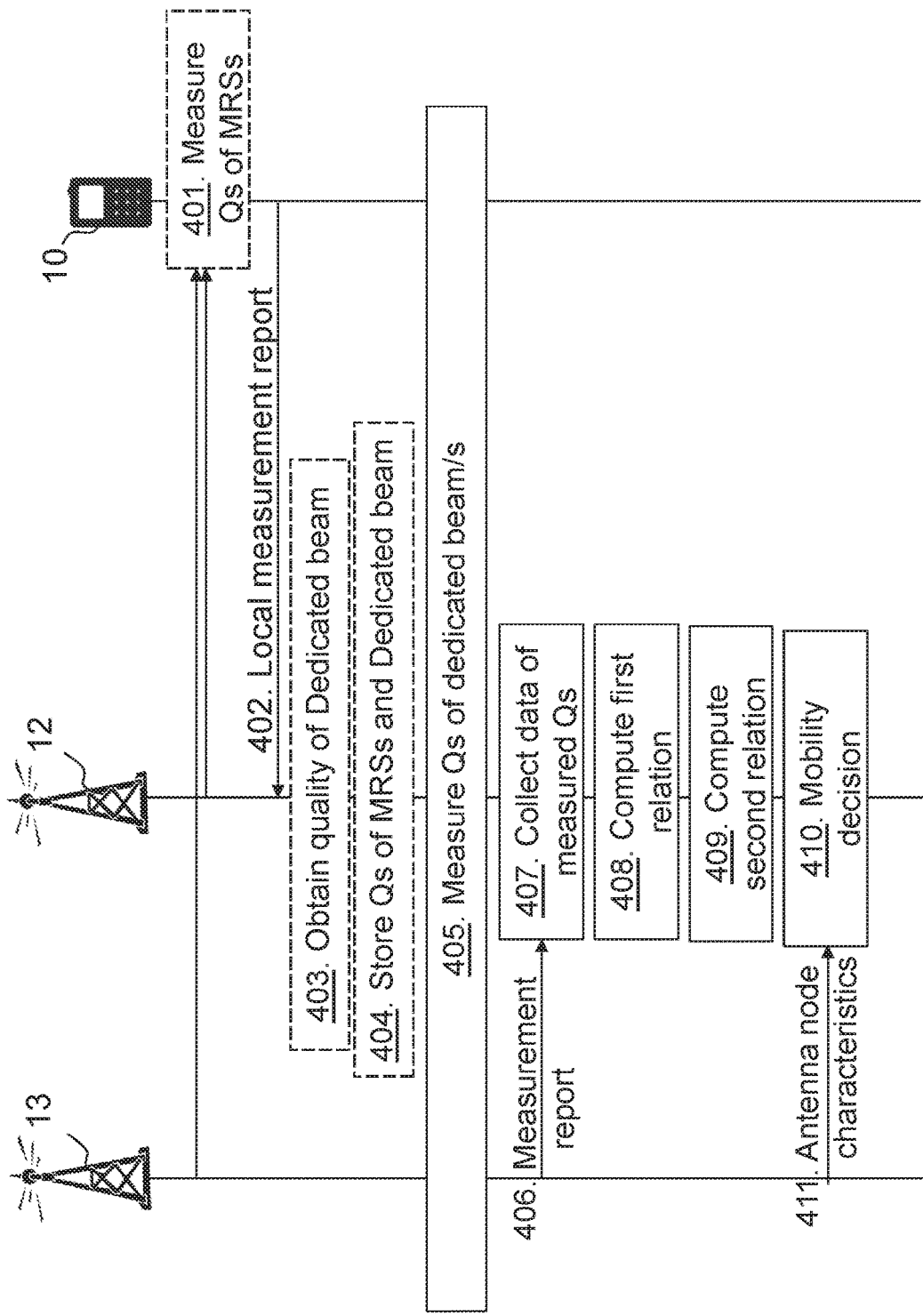
FIG. 4 is a schematic combined flowchart and signaling scheme according to embodiments herein.

FIG. 4 is a combined flowchart and signaling scheme according to embodiments herein.

The following actions are proposed to create a fair comparison between a source node, i.e. the first radio network node 12, and a target node, i.e. the second radio network node 13, and correct a transformation between the mobility measurement beam, also referred to as static beam or service area, and a dedicated beam for data transmission for the wireless device 10.

Action 401. The wireless device 10 may measure a first local MRS strength or quality of the first service area 11 and a second local MRS strength or quality of the second service area 14. E.g., the wireless device 10 may measure received signal power, SINR, Signal to Noise Ratio (SNR), or calculate pathloss at the wireless device 10, e.g. based on measurements of the MRS in respective service area.

Action 402. The wireless device 10 may then report the local MRS strengths or qualities to the first radio network node 12 in a local measurement report to the first radio network node 12.

Action 403. The first radio network node 12 may obtain a first signal strength or quality of a first dedicated beam specific for data transmission for the wireless device 10 in the first service area 11, shown in the previous FIG. 3 with a dashed line. E.g. the first radio network node 12 measures, or receives measurements from wireless device 10, the quality of the first dedicated beam for data transmission or the first radio network node 12 already has this information stored. The first signal strength or quality of the first dedicated beam for data transmission for the wireless device 10 may be in terms of signal quality such as received signal power, SINR, SNR, or calculated pathless at the wireless device 10.

Action 404. The first radio network node 12 may then store the reported local MRS strengths or qualities and the first signal strength or quality of the first dedicated beam for data transmission for the wireless device 10 in the first service area 11.

The first radio network node 12 hands over the wireless device 10 to the second radio network node 13 when a certain threshold is triggered. Notice that before any learning or adaptation has occurred the certain threshold may have some default value. This action will be improved by implementing embodiments shown herein e.g. based on the following actions.

Action 405. The second radio network node 13 measures the second signal strength or quality of the second dedicated beam for data transmission for specific wireless devices in the second service area 14, e.g., wireless devices previously handover. The measurement of the second signal strength or quality in the second radio network node 13 may be carried out after the second dedicated beam has been 'sufficiently' beam-formed or sufficiently long time has elapsed after the handover of the wireless device. The second radio network node 13 may measure and collect measurements of second dedicated beams for a number of wireless devices in the second service area 14.

Action 406. The second radio network node 13 transmits to the first radio network node 12, a measurement report of the measured second signal strength or quality.

Action 407. The first radio network node 12 may thus collect data of e.g. a number of second signal strengths or qualities for a number of second dedicated beams for data transmissions for specific wireless devices in the second service area 14.

Action 408. The first radio network node 12 may, once sufficient data has been collected, i.e. when enough number, above a number threshold, of wireless devices has been measured on, compute a first relation, R_s, between the reported first local MRS strength or quality of the first service area (data from action 401) and first signal strength or quality of the first dedicated beam for data transmission in the first service area (data from action 403). For example, the first relation, R_s, equals the measured first signal strength or quality of the first dedicated beam, Source_LinkBeam_Strength, in relation to the measured first local signal strength or quality of the first service area 11, Source_MRS_Strength.

$$R\_s = Source\_LinkBeam\_Strength / Source\_MRS\_Strength$$

Action 409. The first radio network node 12 may, once sufficient data has been collected for each target node T: compute a second relation R_ti between reported second local MRS strength or quality of the second service area (action 401) and the collected second strength or quality of the second dedicated beam for data transmissions for specific wireless devices in the second service area (action 407).

For example, the second relation, R_t1, equals the measured/estimated second signal strength or quality of the second dedicated beam, Target1_LinkBeam_Strength, in relation to the measured second local signal strength or quality of the second service area 14, Target1_MRS_Strength.

$$R\_t1 = Target1\_LinkBeam\_Strength / Target1\_MRS\_Strength$$

Action 410. The first radio network node 12 then uses the relations R_s and R_ti from actions 408 and 409 as well as reported local MRSs qualities to estimate best node (resulting in best link beam). Hence, embodiments herein may compare first signal strength or quality of the first dedicated beam currently serving the wireless device with the second signal strength or quality of the second dedicated beam which the wireless device 10 will use if moved, i.e. compare first dedicated source beam with second dedicated candidate or target beam, but since the candidate or target beam doesn't yet exist the approximation may be performed using the strength of the static beam of the second service area, i.e. the second local strength or quality, times the second relation.

In some embodiments, the first radio network node 12 may estimate first signal strength in the first dedicated beam for data transmission for the wireless device 10 in the first service area 11, Estimated_Source_LinkBeam_Strength, by using the first relation, R_s, times the reported first local signal strength of the first service area 11, Source_Reported_MRS_Strength. This may be directly measured as well as filtered over sufficiently long time.

$$Estimated\_Source\_LinkBeam\_Strength = R\_s \times Source\_Reported\_MRS\_Strength$$

Furthermore, the first radio network node 12 may estimate second signal strength in the second dedicated beam for data transmission for the wireless device 10 in the second service area 14, Estimated_Target1_LinkBeam_Strength, by using the second relation, R_t1 times the reported second local signal strength of the second service area, Target1_Reported_MRS_Strength.

$$Estimated\_Target1\_LinkBeam\_Strength = R\_t1 \times Target1\_Reported\_MRS\_Strength$$

The first radio network node 12 may then determine a best node serving the wireless device by comparing the estimated signal strengths of the different dedicated beams, e.g. select to radio network node providing the highest estimated signal strength of the dedicated beam for data transmission for the wireless device 10.

Hence, the first radio network node 12 may perform the mobility decision based on the relations. The mobility decision may comprise handing over the wireless device 10 to the second radio network node 13 when received first local signal strength or quality of the first reference signal times the computed first relation is smaller than the received second local signal strength or quality of the second reference signal times the computed second relation. It should be noted that these relations (R_s, R_ti) may further be used to change the mobility measurement beam coverage if needed being another example of a mobility decision.

Action 411. The first radio network node 12 may use, to further improve accuracy of the strengths or qualities, already received (or configured) antenna node characteristics or may retrieve this information from the antenna nodes that corresponds to the MRSs in the measurement report. This action is optional but can improve the situation for initial wireless devices where not enough data has been collected for the machine learning to compute a fair comparison.

To further improve the accuracy the mobility decision may further involve using data such as antenna types and their abilities, wireless device type and abilities, frequency in use and machine learning mechanisms to create the relations or a coefficient that will be applied on the measurement performed on the reference signals of the service areas to better reflect how the situation will look like if the wireless device is actually moved to a different service area, such as the second service area 14. This can then be compared to current beam-formed beam, i.e. first dedicated beam, which is currently serving the wireless device 10.

The wanted result is to compare the first dedicated beam currently serving the wireless device 10 with the second dedicated beam which the wireless device 10 will use if moved, i.e. candidate dedicated beam, but since the candidate dedicated beam doesn't yet exist the approximation performed using the local strengths or qualities of the static beams combined with the computed coefficients or relations will be the second best.

Embodiments herein improve the mobility decision in a beam-formed system, resulting in a better selection when to switch between two beams which in turn minimizes the negative effect on Transmission Control Protocol (TCP) of sudden changes in throughput. The congestion control of TCP protocol follows the principle of slow start and exponential back-off strategies. It starts with less bits being sent and then gradually rises to higher number of bits but if there is a failure in sending the packet, then the reduction in the packet size will be exponential. If the beam switching is happening from a good beam to a bad beam, from the data transmission point of view, then the TCP protocol will suffer. Embodiments herein provides a manner where it is more reliable that the quality of data beams is good, then TCP based transmissions will not suffer. Furthermore, some embodiments herein creates fair measurement understanding between same or different types of antennas with different beamforming capabilities and characteristics.

Figure 5:
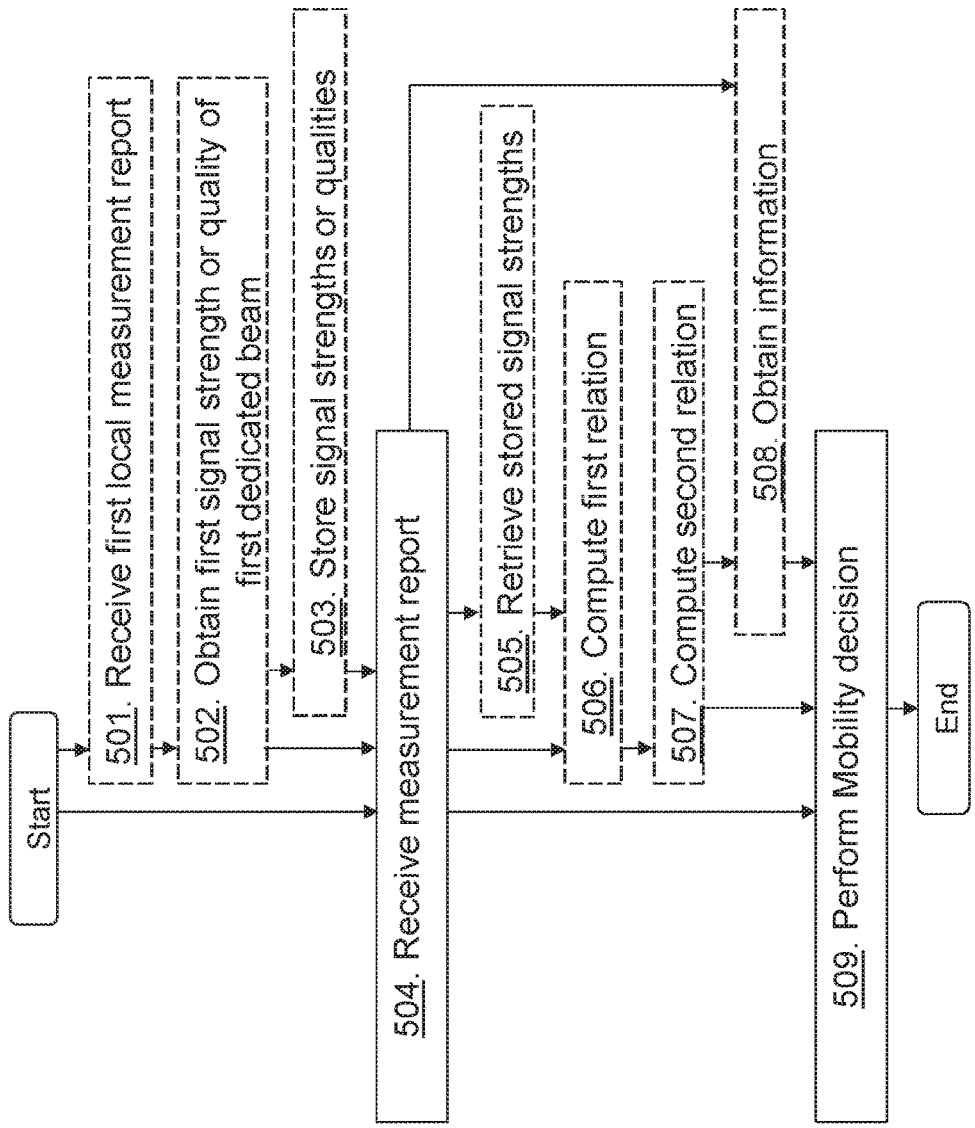
FIG. 5 is a schematic flowchart depicting a method performed by a first radio network node according to embodiments herein.

FIG. 5 is a schematic flowchart depicting a method performed by the first radio network node 12 for handling mobility of the wireless device 10 in the wireless communication network 1 according to embodiments herein. The first radio network node 12 provides radio coverage over the first service area 11 using the first reference signal, e.g. first MRS, for identifying the first service area 11 in the wireless communication network 1. The second radio network node 13 provides radio coverage over the second service area 14 using the second reference signal, e.g., second MRS, for identifying the second service area 14 in the wireless communication network 1. The actions do not have to be taken in the order stated below, but may be taken in any suitable order. Actions performed in some embodiments are marked with dashed boxes.

Action 501. The first radio network node 12 may receive the first local measurement report from the wireless device 10, which first local measurement report indicates the first local signal strength or quality of the first reference signal and the second local signal strength or quality of the second reference signal at the wireless device 10.

Action 502. The first radio network node 12 may obtain the first signal strength or quality of the first dedicated beam for data transmission for the wireless device 10 in the first service area 11. The first dedicated beam may use demodulation reference signals identifying the dedicated beam and/or channel state information reference signals.

Action 503. The first radio network node 12 may store the first local signal strength or quality of the first reference signal and the second local signal strength or quality of the second reference signal at the wireless device 10, and the obtained first signal strength or quality of the first dedicated beam for data transmission for the wireless device 10 in the first service area.

Action 504. The first radio network node 12 receives the measurement report from the second radio network node 13, which measurement report indicates the second signal strength or quality of the second dedicated beam used for data transmission for wireless devices in the second service area 14. The second dedicated beam may use demodulation reference signals identifying the dedicated beam and/or channel state information reference signals. The measurement report received from the second radio network node 13 may comprise a recorded distribution of measurements of second signal strengths or qualities of second dedicated beams for data transmission for wireless devices in the second service area 14. The measurements may be recorded for a number of wireless devices over a set time period.

Action 505. The first radio network node 12 may retrieve the stored first local signal strength or quality of the first reference signal and the stored second local signal strength or quality of the second reference signal at the wireless device 10, and the stored first signal strength or quality of the first dedicated beam for data transmission for the wireless device 10 in the first service area 11.

Action 506. The first radio network node 12 may compute the first relation between the first local signal strength or quality of the first reference signal, see action 501, and the obtained first signal strength or quality of the first dedicated beam used for data transmission for the wireless device 10 in the first service area, see action 502. The first radio network node 12 may compute the first relation by computing a first distribution of the first relations.

Action 507. The first radio network node 12 may compute second relation between the second local signal strength or quality of the second reference signal, see action 501, and the received second signal strength or quality of the second dedicated beam used for data transmission for the wireless devices in the second service area, see action 504. The first radio network node 12 may compute the second relation by computing a second distribution of second relations from the received measurement report.

Action 508. The first radio network node 12 may obtain information regarding the wireless device capability of receiving multiple beams or dedicated beams for data transmission for the wireless device 10, and/or antenna characteristics of the first radio network node 12 and/or the second radio network node 13.

Action 509. The first radio network node 12 performs the mobility decision for the wireless device 10 by taking the second signal strength or quality, indicated in the received measurement report, into account. The first radio network node 12 may perform the mobility decision by further taking into account the first local signal strength or quality of the first reference signal, the second local signal strength or quality of the second reference signal, and the obtained first signal strength or quality of the first dedicated beam for data transmission for the wireless device in the first service area 11. The mobility decision may be based on the first and second computed relations. The first radio network node 12 may perform the mobility decision by determining a radio network node, e.g. a preferred radio network node, to serve the wireless device 10 by comparing first local signal strength or quality of the first reference signal times the computed first relation, with second local signal strength or quality of the second reference signal times the computed second relation. The first radio network node 12 may in some embodiments perform the mobility decision by comparing the first and second distributions and based on the comparison the first radio network node 12 may perform the mobility decision. E.g. if the first distribution indicates a concentrated distribution of first relations around a first value whereas the second distribution indicates a very wide interval of second relations stretching past the first value, the first radio network node may select the first radio network node to keep the wireless device 10 since the probability is higher with a concentrated distribution than with a wide spanning distribution. In some embodiments, the first radio network node 12 may perform the mobility decision taking the obtained information, see action 508, into account.

Figure 6:
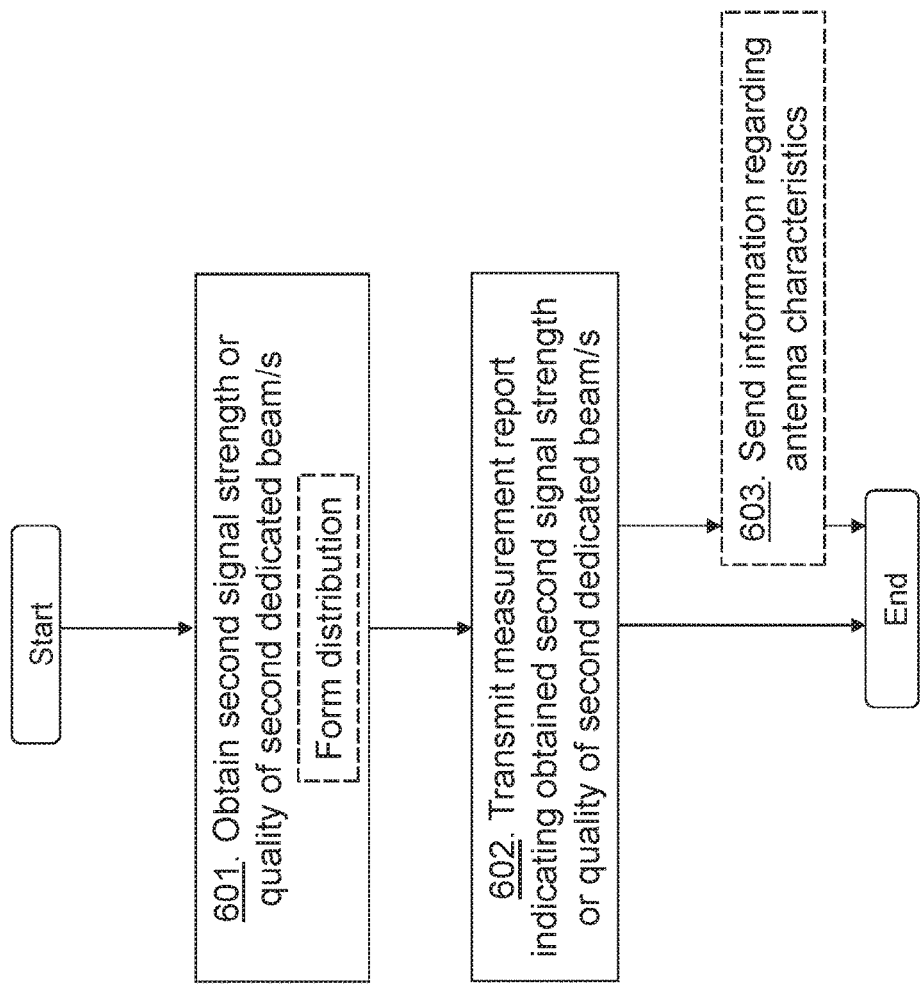
FIG. 6 is a schematic flowchart depicting a method performed by a second radio network node according to embodiments herein.

FIG. 6 is a schematic flowchart depicting a method performed by the second radio network node for handling mobility of the wireless device in the wireless communication network 1 according to embodiments herein. The wireless device 10 is served by the first radio network node 12 providing radio coverage over the first service area 11 using the first reference signal for identifying the first service area 11 in the wireless communication network 1. The second radio network node 13 provides radio coverage over the second service area 14 using the second reference signal for identifying the second service area 14 in the wireless communication network 1. The actions do not have to be taken in the order stated below, but may be taken in any suitable order. Actions performed in some embodiments are marked with dashed boxes.

Action 601. The second radio network node 13 obtains the second signal strength or quality of the second dedicated beam for data transmission for wireless devices in the second service area 14. The second signal strength or quality of the second dedicated beam for data transmission may be based on one or more measurements performed by wireless devices on reference signals used for second dedicated beams for data transmission. For example, the reference signals may be used for the beam refinement of the beam used for data transmission such as on demodulation reference signals identifying the second dedicated beam for data transmission and/or channel state information reference signals. The second radio network node 13 may obtain the second signal strength or quality of the second dedicated beam for data transmission over a time period after the wireless devices are handed over to the second radio network node 13. The second radio network node 13 may obtain the second signal strength or quality by obtaining a plurality of the second signal strengths or qualities of second dedicated beams for data transmission for wireless devices forming a distribution of measurements of signal strengths or qualities of second dedicated beams for data transmission for wireless devices in the second service area 14.

Action 602. The second radio network node 13 transmits to the first radio network node 12, the measurement report, which measurement report indicates the obtained second signal strength or quality of the second dedicated beam for data transmission for wireless devices in the second service area 14. The second radio network node 13 may transmit the formed distribution to the first radio network node 12.

Action 603. The second radio network node 13 may send to the first radio network node 12, information regarding antenna characteristics of the second radio network node 13.

Embodiments herein disclose an exchange of the measurements of second dedicated beams in the second radio network node 13 with the first radio network node 12 to be used to calculate one or more coefficients such as the first relation and the second relation. Recalculating the measurement result, measured by the wireless device 10 on the static beams or service area, using the one or more coefficients into a result, improves the accuracy of the mobility decision since the result better reflects the conditions the wireless device 10 may experience once the wireless device 10 is in the second service area 14.

Storing measurements for dedicated beams in both the first and second service area once one or more wireless device are moved into the second service area, and further using these stored measurements to learn what an optimal beam threshold may be used further improves the mobility decision. This may be wireless device group specific, meaning that wireless devices with different characteristics and capability might not use the same optimal beam threshold.

Figure 7:
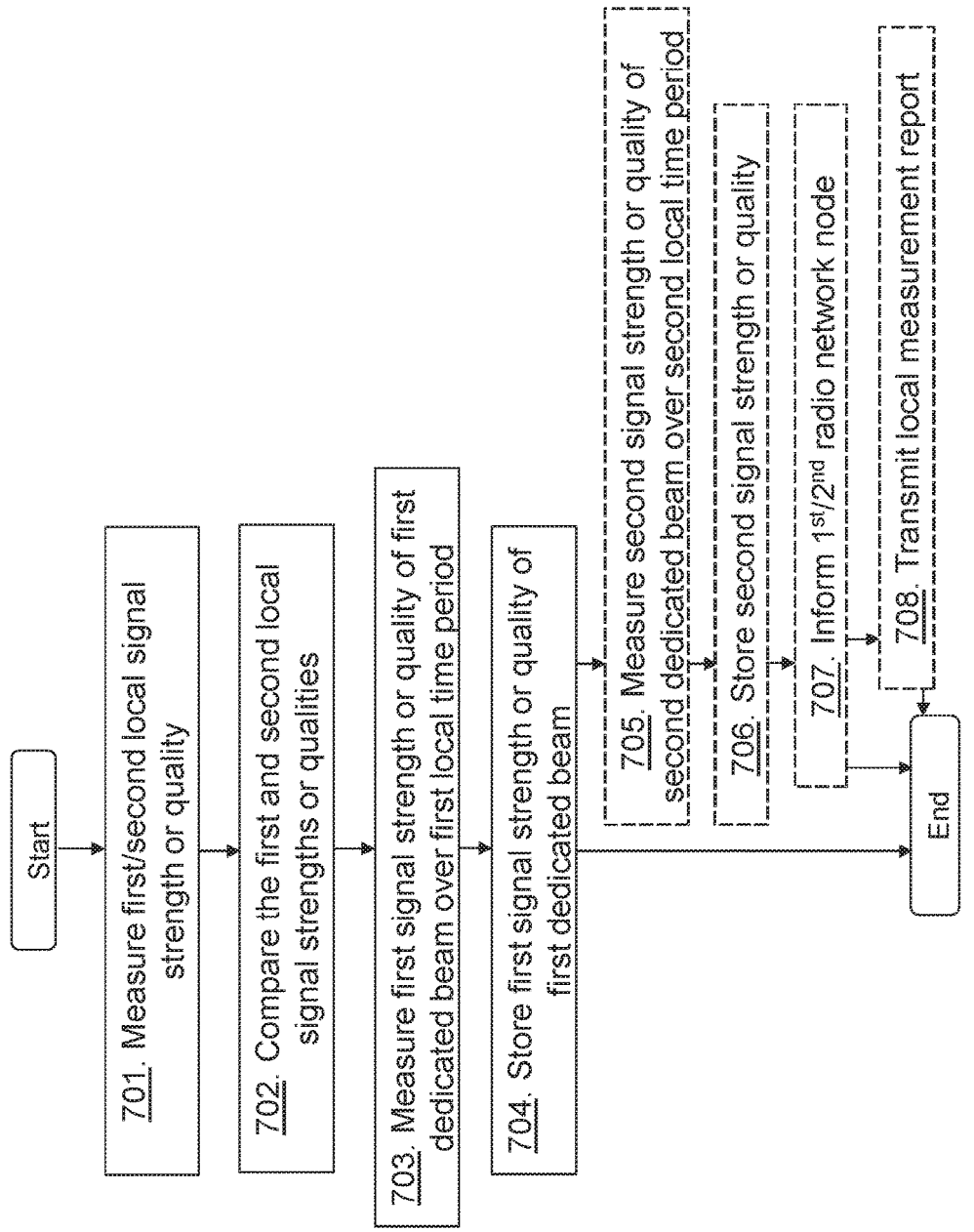
FIG. 7 is a schematic flowchart depicting a method performed by a wireless device according to embodiments herein.

FIG. 7 is a schematic flowchart depicting a method performed by the wireless device 10 for handling mobility of the wireless device in the wireless communication network 1 according to embodiments herein. The actions do not have to be taken in the order stated below, but may be taken in any suitable order. Actions performed in some embodiments are marked with dashed boxes. The wireless device is served by the first radio network node 12 providing radio coverage over the first service area 11 using the first reference signal for identifying the first service area 11 in the wireless communication network. The second radio network node 13 provides radio coverage over the second service area 14 using the second reference signal for identifying the second service area 14 in the wireless communication network 1.

Action 701. The wireless device 10 measures the first local signal strength or quality of the first reference signal and the second local signal strength or quality of the second reference signal at the wireless device 10. That is, the wireless device measures the signal strengths or qualities of the static beams.

Action 702. The wireless device 10 compares the first local signal strength or quality of the first reference signal with the second local signal strength or quality of the second reference signal. The comparison may indicate fulfilment of a certain condition e.g. indicate a handover, or a difference in received powers of reference signals is above a threshold.

Action 703. The wireless device 10, when the comparison indicates the certain condition, measures the first signal strength or quality of the first dedicated beam for data transmission for the wireless device 10 in the first service area 11 over a first local time period to handover of the wireless device 10 is triggered.

Action 704. The wireless device 10 then stores the measured first signal strength or quality over the first local time period.

Action 705. The wireless device 10 may measure the second signal strength or quality of the second dedicated beam for data transmission for the wireless device 10 in the second service area 14 over a second local time period corresponding to the first local time period.

Action 706. The wireless device 10 may furthermore store the measured second signal strength or quality over the second local time period.

Action 707. The wireless device 10 may further inform the first and/or the second radio network node of the stored first and second signal strengths or qualities.

Action 708. The wireless device 10 may transmit a local measurement report to the first radio network node, which local measurement report indicates the first local signal strength or quality of the first reference signal and the second local signal strength or quality of the second reference signal at the wireless device 10.

Figure 8:
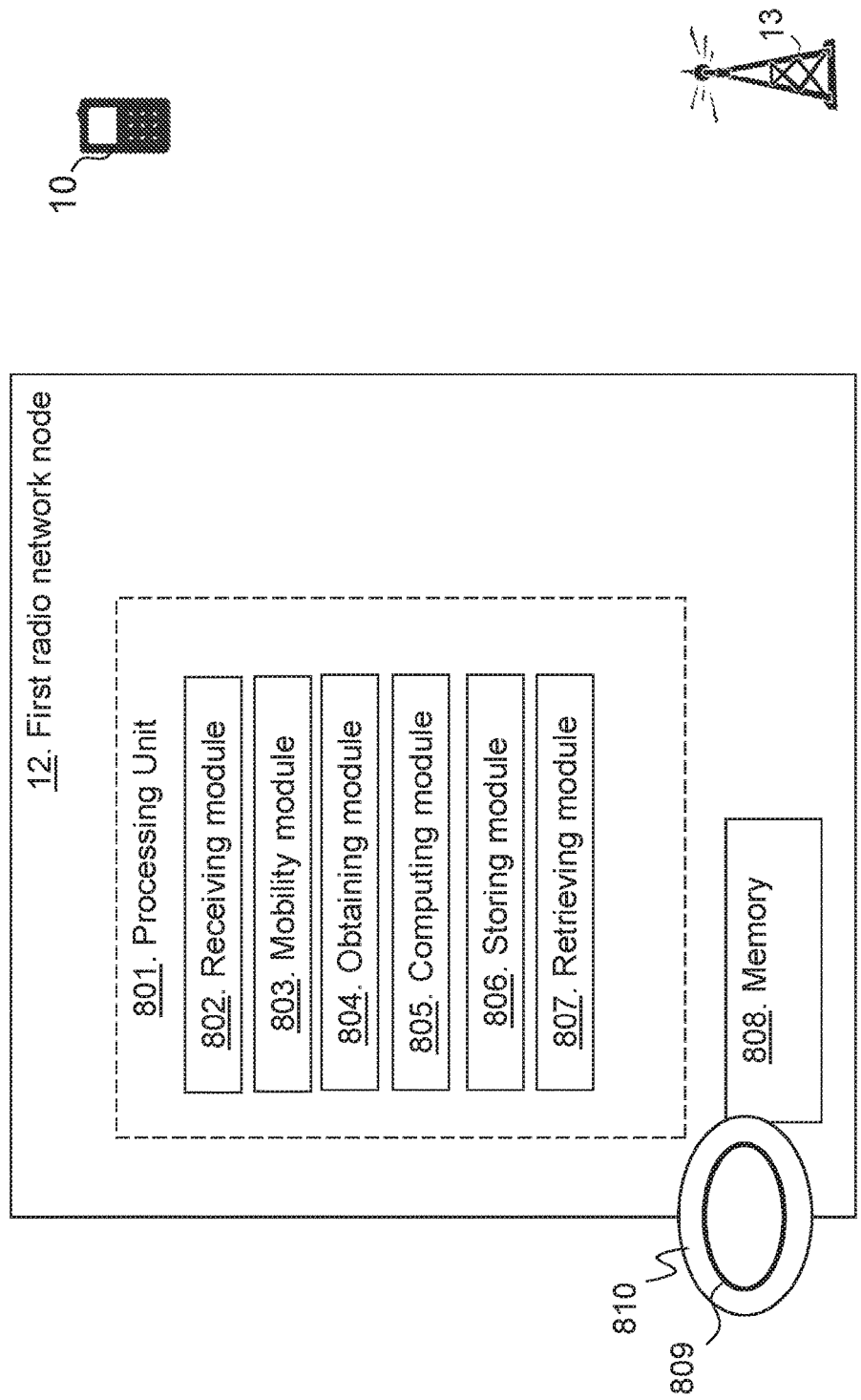
FIG. 8 is a block diagram depicting a first radio network node according to embodiments herein.

FIG. 8 is a block diagram depicting the first radio network node 12 for handling mobility of the wireless device 10 in the wireless communication network 1 according to embodiments herein. The first radio network node 12 is configured to provide radio coverage over the first service area 11 using the first reference signal for identifying the first service area in the wireless communication network 1.

The first radio network node 12 may comprise a processing unit 801, e.g. one or more processors, configured to perform the methods herein.

The first radio network node 12 may comprise a receiving module 802, e.g. a receiver or a transceiver. The first radio network node 12, the processing unit 801, and/or the receiving module 802 is configured to receive the measurement report from the second radio network node 13 being configured to provide radio coverage over the second service area 14 using the second reference signal for identifying the second service area 14 in the wireless communication network 1. The measurement report indicates the second signal strength or quality of the second dedicated beam used for data transmission for wireless devices in the second service area 14.

The first radio network node 12 may comprise a mobility module 803. The first radio network node 12, the processing unit 801, and/or the mobility module 803 is configured to perform the mobility decision for the wireless device 10 taking the second signal strength or quality, indicated in the received measurement report, into account.

The first radio network node 12, the processing unit 801, and/or the receiving module 802 may be configured to receive the local measurement report from the wireless device 10, which local measurement report indicates the first local signal strength or quality of the first reference signal and the second local signal strength or quality of the second reference signal at the wireless device 10.

The first radio network node 12 may comprise an obtaining module 804. The first radio network node 12, the processing unit 801, and/or the obtaining module 804 may be configured to obtain the first signal strength or quality of the first dedicated beam for data transmission for the wireless device 10 in the first service area 11.

The first radio network node 12, the processing unit 801, and/or the mobility module 803 may then be configured to further take the first local signal strength or quality of the first reference signal, the second local signal strength or quality of the second reference signal, and the obtained first signal strength or quality of the first dedicated beam for data transmission for the wireless device 10 in the first service area into account when performing the mobility decision.

The first radio network node 12 may comprise a computing module 805. The first radio network node 12, the processing unit 801, and/or the computing module 805 may be configured to compute the first relation between the first local signal strength or quality of the first reference signal and the obtained first signal strength or quality of the first dedicated beam used for data transmission for the wireless device 10 in the first service area. The first radio network node 12, the processing unit 801, and/or the computing module 805 may further be configured to compute the second relation between the second local signal strength or quality of the second reference signal and the received second signal strength or quality of the second dedicated beam used for data transmission for the wireless devices in the second service area 14.

The first radio network node 12, the processing unit 801, and/or the mobility module 803 may then be configured to perform the mobility decision based on the first and second computed relations.

The first radio network node 12 may comprise a storing module 806. The first radio network node 12, the processing unit 801, and/or the storing module 806 may be configured to store the first local signal strength or quality of the first reference signal and the second local signal strength or quality of the second reference signal at the wireless device 10, and the obtained first signal strength or quality of the first dedicated beam for data transmission for the wireless device 10 in the first service area 11.

The first radio network node 12 may comprise a retrieving module 807. The first radio network node 12, the processing unit 801, and/or the retrieving module 807 may be configured to retrieve, for computing the first and second relations, the stored first local signal strength or quality of the first reference signal and the stored second local signal strength or quality of the second reference signal at the wireless device 10, and the stored first signal strength or quality of the first dedicated beam for data transmission for the wireless device 10 in the first service area 11.

The first radio network node 12, the processing unit 801, and/or the mobility module 803 may then be configured to perform the mobility decision by being configured to determine a radio network node to serve the wireless device 10, a serving radio network node, by comparing the received first local signal strength or quality of the first reference signal times the computed first relation, with the received second local signal strength or quality of the second reference signal times the computed second relation.

The measurement report received from the second radio network node 13 may comprise the recorded distribution of measurements of second signal strengths or qualities of second dedicated beams for data transmission for wireless devices in the second service area 14. The first radio network node 12, the processing unit 801, and/or the computing module 805 may then be configured to compute the first relation by being configured to compute the first distribution of the first relations and may further be configured to compute the second relation by being configured to compute the second distribution of second relations from the received measurement report. The first radio network node 12, the processing unit 801, and/or the mobility module 803 may then be configured to compare the first and second distributions and to perform the mobility decision based on the comparison.

The first radio network node 12, the processing unit 801, and/or the obtaining module 804 may be configured to obtain information regarding the wireless device capability of receiving multiple beams or dedicated beams for data transmission for the wireless device 10, and/or antenna characteristics of the first radio network node 12 and/or the second radio network node 13. The first radio network node 12, the processing unit 801, and/or the mobility module 803 may then be configured to perform the mobility decision further taking the obtained information into account.

The first radio network node 12 further comprises a memory 808. The memory comprises one or more units to be used to store data on, such as MRSs, strengths or qualities, distributions, thresholds, relations, capabilities, antenna characteristics, applications to perform the methods disclosed herein when being executed, and similar.

The methods according to the embodiments described herein for the first radio network node 12 are respectively implemented by means of e.g. a computer program 809 or a computer program product, comprising instructions, i.e., software code portions, which, when executed on at least one processor, cause the at least one processor to carry out the actions described herein, as performed by the first radio network node 12. The computer program 809 may be stored on a computer-readable storage medium 810, e.g. a disc or similar. The computer-readable storage medium 810, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 9:
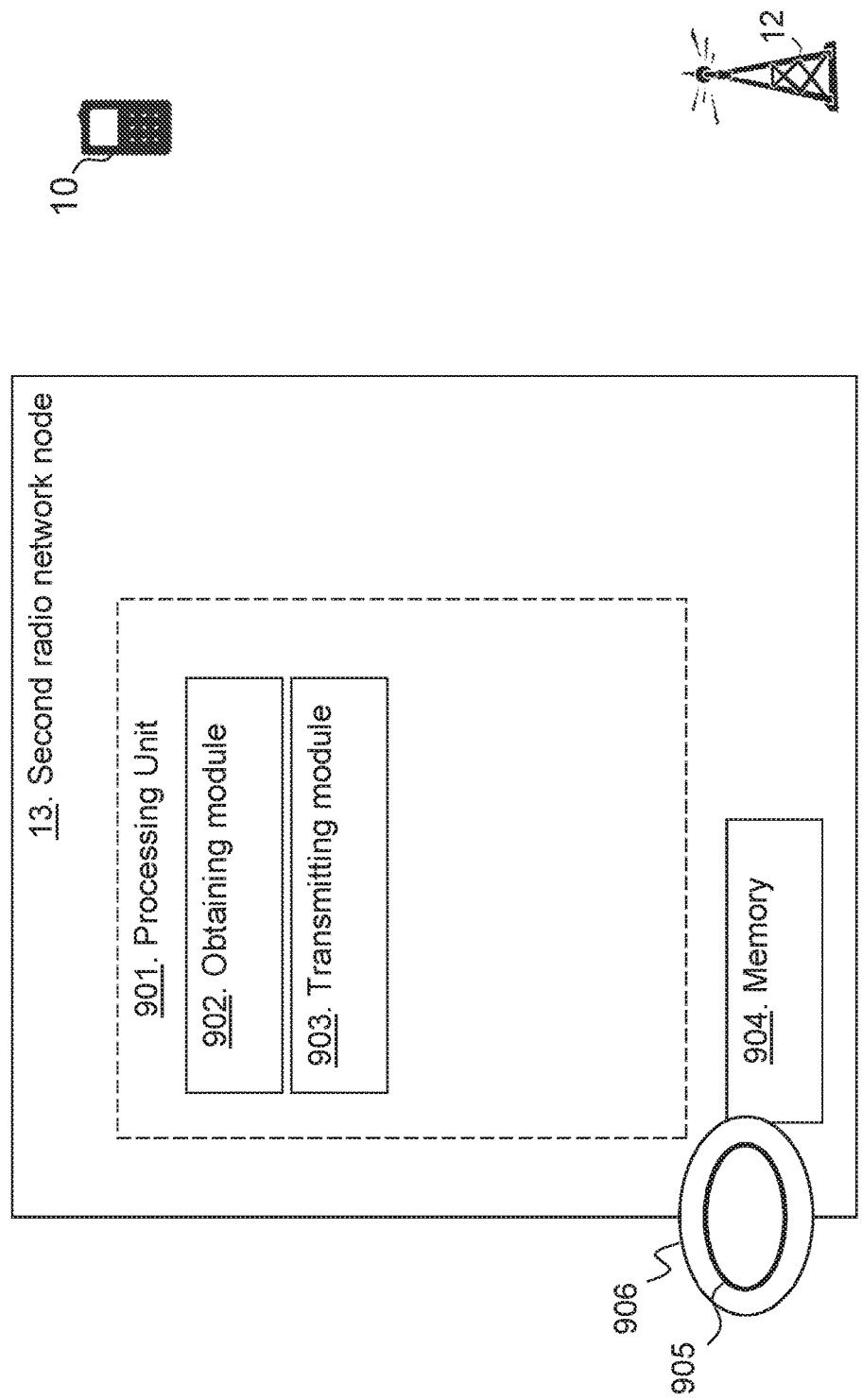
FIG. 9 is a block diagram depicting a second radio network node according to embodiments herein.

FIG. 9 is a block diagram depicting the second radio network node 13 for handling mobility of the wireless device 10 in the wireless communication network 1 according to embodiments herein. The second radio network node 13 is configured to provide radio coverage over the second service area 14 using the second reference signal for identifying the second service area 14 in the wireless communication network. The wireless device 10 is served by the first radio network node 12 providing radio coverage over the first service area 11 using the first reference signal for identifying the first service area in the wireless communication network 1.

The second radio network node 13 may comprise a processing unit 901, e.g., one or more processors, configured to perform the methods herein.

The second radio network node 13 may comprise an obtaining module 902, e.g. a receiver or a transceiver. The second radio network node 13, the processing unit 901, and/or the obtaining module 902 is configured to obtain the second signal strength or quality of the second dedicated beam for data transmission for wireless devices in the second service area 14. The second signal strength or quality of the second dedicated beam for data transmission may be based on one or more measurements performed by wireless devices on reference signals used for second dedicated beams for data transmissions. The second radio network node 13, the processing unit 901, and/or the obtaining module 902 may be configured to obtain the second signal strength or quality of the second dedicated beam for data transmission over the time period after the wireless devices are handed over to the second radio network node.

The second radio network node 13 may comprise a transmitting module 903, e.g. a transmitter or a transceiver. The second radio network node 13, the processing unit 901, and/or the transmitting module 903 is configured to transmit, to the first radio network node 12, the measurement report, which measurement report indicates the obtained second signal strength or quality of the second dedicated beam for data transmission for wireless devices in the second service area 14.

The second radio network node 13, the processing unit 901, and/or the obtaining module 902 may be configured to obtain the plurality of the second signal strengths or qualities of dedicated beams for data transmission for wireless devices forming the distribution of measurements of signal strengths or qualities of dedicated beams for data transmission for wireless devices in the second service area 14. The second radio network node 13, the processing unit 901, and/or the transmitting module 903 may then be configured to transmit the formed distribution to the first radio network node 12.

The second radio network node 13, the processing unit 901, and/or the transmitting module 903 may further be configured to send, to the first radio network node 12, information regarding antenna characteristics of the second radio network node 13.

The second radio network node 13 further comprises a memory 904. The memory comprises one or more units to be used to store data on, such as MRSs, strengths or qualities, distributions, capabilities, antenna characteristics, applications to perform the methods disclosed herein when being executed, and similar.

The methods according to the embodiments described herein for the second radio network node 13 are respectively implemented by means of e.g. a computer program 905 or a computer program product, comprising instructions, i.e., software code portions, which, when executed on at least one processor, cause the at least one processor to carry out the actions described herein, as performed by the second radio network node 13. The computer program 905 may be stored on a computer-readable storage medium 906, e.g. a disc or similar. The computer-readable storage medium 906, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium FIG. 10 is a block diagram depicting the wireless device 10 for handling mobility of the wireless device in the wireless communication network 1 according to embodiments herein. The wireless device 10 is configured to be served by the first radio network node 12 providing radio coverage over the first service area 11 using the first reference signal for identifying the first service area 11 in the wireless communication network 1. The second radio network node 13 is configured to provide radio coverage over the second service area 14 using the second reference signal for identifying the second service area 14 in the wireless communication network 1.

The wireless device 10 may comprise a processing unit 1001, e.g. one or more processors, configured to perform the methods herein.

The wireless device 10 may comprise a measuring module 1002. The wireless device 10, the processing unit 1001, and/or the measuring module 1002 is configured to measure the first local signal strength or quality of the first reference signal and the second local signal strength or quality of the second reference signal at the wireless device 10.

The wireless device 10 may comprise a comparing module 1003. The wireless device 10, the processing unit 1001, and/or the comparing module 1003 is configured to compare the first local signal strength or quality of the first reference signal with the second local signal strength or quality of the second reference signal.

The wireless device 10, the processing unit 1001, and/or the measuring module 1002 is then configured to measure, when the comparison indicates a certain condition such as a handover, the first signal strength or quality of the first dedicated beam for data transmission for the wireless device in the first service area over the first local time period to or until handover of the wireless device is triggered. The wireless device 10 may comprise a storing module 1004. The wireless device 10, the processing unit 1001, and/or the storing module 1004 is configured to store the measured first signal strength or quality over the first local time period.

The wireless device 10, the processing unit 1001, and/or the measuring module 1002 is may be configured to measure, after being handover, the second signal strength or quality of the second dedicated beam for data transmission for the wireless device 10 in the second service area 14 over the second local time period corresponding to the first local time period. The wireless device 10, the processing unit 1001, and/or the storing module 1003 may then be configured to store the measured second signal strength or quality over the second local time period. Furthermore, the wireless device 10 may comprise an informing module 1005, e.g. a transmitter or transceiver. The wireless device 10, the processing unit 1001, and/or the informing module 1005 may be configured to inform the first and/or the second radio network node of the stored first and second signal strengths or qualities.

The wireless device 10, the processing unit 1001, and/or the informing module 1005 may be configured to transmit the local measurement report to the first radio network node 12, which local measurement report indicates the first local signal strength or quality of the first reference signal and the second local signal strength or quality of the second reference signal at the wireless device 10. The wireless device 10, the processing unit 1001, and/or the informing module 1005 may further be configured to transmit information regarding the wireless device capability of receiving multiple beams or dedicated beams for data transmission for the wireless device 10.

The wireless device 10 further comprises a memory 1006. The memory comprises one or more units to be used to store data on, such as capabilities, strengths or qualities, distributions, local time intervals or periods, applications to perform the methods disclosed herein when being executed, and similar.

The methods according to the embodiments described herein for the wireless device 10 are respectively implemented by means of e.g. a computer program 1007 or a computer program product, comprising instructions, i.e., software code portions, which, when executed on at least one processor, cause the at least one processor to carry out the actions described herein, as performed by the wireless device 10. The computer program 1007 may be stored on a computer-readable storage medium 1008, e.g. a disc or similar. The computer-readable storage medium 1008, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g.

Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSMIG-ERAN, Wi Fi, WLAN, CDMA2000 etc.

As used herein, a "Wireless device dedicated source beam-formed beam"=dedicated beam for data transmissions for the wireless device in the first service area 14, or "dedicated source beam" is the beam-formed beam that maximizes the energy radiated towards the wireless device and/or reduces interference and is currently in use when sending/receiving data to/from the wireless device.

Candidate Wireless device specific beam-formed beam=dedicated beam for data transmissions for the wireless device in the second service area 14. As used herein, a "dedicated candidate beam" or a "target beam" or a "neighbor beam" is a beam-formed antenna radiation pattern not yet used for sending/receiving the data to/from the wireless device. This beam does not normally exist until the wireless device is actually there and the beamforming mechanisms have shaped the beam to match the position of the wireless device, such as a geo position and/or radio position.

Mobility measurement beam=static beam or service area. As used herein, a "mobility measurement beam" is the beam used by the source Access Node (AN) or target AN to communicate with any or all UEs located within this area.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included, Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGO Automatic gain control
ANR Automatic neighbor relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RE Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signaling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:

1. A method performed by a first radio network node for handling mobility of a wireless device in a wireless communication network, the first radio network node providing radio coverage over a first service area using a first reference signal for identifying the first service area in the wireless communication network, and a second radio network node providing radio coverage over a second service area using a second reference signal for identifying the second service area in the wireless communication network, the method comprising:

receiving a measurement report from the second radio network node, which measurement report indicates one of a second signal strength and a quality of a second dedicated beam used for data transmission for wireless devices in the second service area;

receiving a local measurement report from the wireless device, which local measurement report indicates one of a first local signal strength and a quality of the first reference signal and one of a second local signal strength and a quality of the second reference signal at the wireless device;

obtaining one of a first signal strength and a quality of a first dedicated beam for data transmission for the wireless device in the first service area; and performing a mobility decision for the wireless device taking the one of the second signal strength and the quality, indicated in the received measurement report, the one of the first local signal strength and the quality of the first reference signal, the one of the second local signal strength and the quality of the second reference signal, and the one of the obtained first signal strength and the quality of the first dedicated beam for data transmission for the wireless device in the first service area into account.

2. The method according to claim 1, further comprising:
computing a first relation between the one of the first local signal strength and the quality of the first reference signal and the obtained one of the first signal strength and the quality of the first dedicated beam used for data transmission for the wireless device in the first service area;

computing a second relation between the one of the second local signal strength and the quality of the second reference signal and the one of the received second signal strength and the quality of the second dedicated beam used for data transmission for the wireless devices in the second service area; and the performing the mobility decision is based on the first and second computed relations.

3. The method according to claim 2, further comprising:
storing the one of the first local signal strength and the quality of the first reference signal and the one of the second local signal strength and the quality of the second reference signal at the wireless device, and the obtained one of the first signal strength and the quality of the first dedicated beam for data transmission for the wireless device in the first service area; and for computing the relations, retrieving the stored one of the first local signal strength and the quality of the first reference signal and the stored one of the second local signal strength and the quality of the second reference signal at the wireless device, and the stored one of the first signal strength and the quality of the first dedicated beam for data transmission for the wireless device in the first service area.

4. The method according to claim 2, wherein the performing the mobility decision comprises determining a radio network node to serve the wireless device by comparing the received one of the first local signal strength and the quality of the first reference signal times the first relation with the received one of the second local signal strength and the quality of the second reference signal times the computed second relation.

5. The method according to claim 2, wherein the measurement report received from the second radio network node comprises a recorded distribution of measurements of one of the second signal strengths and the qualities of second dedicated beams for data transmission for wireless devices in the second service area, and the computing the first relation comprises computing a first distribution of the first relations and the computing the second relation comprises computing a second distribution of second relations from the received measurement report and the performing the mobility decision comprises comparing the first and second distributions and based on the comparison performing the mobility decision.

6. The method according to claim 1, further comprising:
obtaining information regarding at least one of:
the wireless device capability of receiving one of multiple beams and dedicated beams for data transmission for the wireless device; and
antenna characteristics of at least one of the first radio network node and the second radio network node; and
the performing the mobility decision further takes the obtained information into account.

7. A first radio network node for handling mobility of a wireless device in a wireless communication network, the first radio network node is configured to provide radio coverage over a first service area using a first reference signal for identifying the first service area in the wireless communication network, the first radio network node being configured to:
receive a measurement report from a second radio network node configured to provide radio coverage over a second service area using a second reference signal for identifying the second service area in the wireless communication network, which measurement report indicates one of a second signal strength and a quality of a second dedicated beam used for data transmission for wireless devices in the second service area;
receive a local measurement report from the wireless device, which local measurement report indicates one of a first local signal strength and a quality of the first reference signal and one of a second local signal strength and a quality of the second reference signal at the wireless device;
obtain one of a first signal strength and a quality of a first dedicated beam for data transmission for the wireless device in the first service area; and
perform a mobility decision for the wireless device taking the one of the second signal strength and the quality, indicated in the received measurement report, the one of the first local signal strength and the quality of the first reference signal, the one of the second local signal strength and the quality of the second reference signal, and the one of the obtained first signal strength and the quality of the first dedicated beam for data transmission for the wireless device in the first service area into account.

8. The first radio network node according to claim 7, further being configured to:
compute a first relation between the one of the first local signal strength or quality of the first reference signal and the one of the obtained first signal strength or quality of the first dedicated beam used for data transmission for the wireless device in the first service area;
compute a second relation between the one of the second local signal strength and the quality of the second reference signal and the one of the received second signal strength and the quality of the second dedicated beam used for data transmission for the wireless devices in the second service area; and
perform the mobility decision based on the first and second computed relations.

9. The first radio network node according to claim 8, further being configured to:
store the one of the first local signal strength and the quality of the first reference signal and the one of the second local signal strength and the quality of the second reference signal at the wireless device, and the obtained one of the first signal strength and the quality of the first dedicated beam for data transmission for the wireless device in the first service area; and
retrieve, for computing the first and second relations, the stored one of the first local signal strength and the quality of the first reference signal and the stored one of the second local signal strength and the quality of the second reference signal at the wireless device, and the stored one of the first signal strength and the quality of the first dedicated beam for data transmission for the wireless device in the first service area.

10. The first radio network node according to claim 8, being configured to perform the mobility decision by being configured to determine a radio network node to serve the wireless device by comparing the received one of the first local signal strength and the quality of the first reference signal times the computed first relation with the received one of the second local signal strength and the quality of the second reference signal times the computed second relation.

11. The first radio network node according to any claim 8, wherein the measurement report received from the second radio network node comprises a recorded distribution of measurements of one of second signal strengths and qualities of second dedicated beams for data transmission for wireless devices in the second service area, and the first radio network node is configured to compute the first relation by being configured to compute a first distribution of the first relations and is configured to compute the second relation by being configured to compute a second distribution of second relations from the received measurement report, and further configured to compare the first and second distributions and to perform the mobility decision based on the comparison.

12. The first radio network node according to claim 7, further configured to:
obtain information regarding at least one of:
the wireless device capability of receiving one of multiple beams and dedicated beams for data transmission for the wireless device; and
antenna characteristics of at least one of the first radio network node and the second radio network node; and
perform the mobility decision taking the obtained information into account.

* * * * *